May 19, 1964 R. LITWINOFF 3,133,528
TUBULAR HEATING ELEMENT FOR HEATING FLUIDS
Filed May 28, 1962 5 Sheets-Sheet 1

Inventor:
RICHARD LITWINOFF

By *K. A. Mayr*
Attorney

Inventor:
RICHARD LITWINOFF
By K.A. Mayr
Attorney

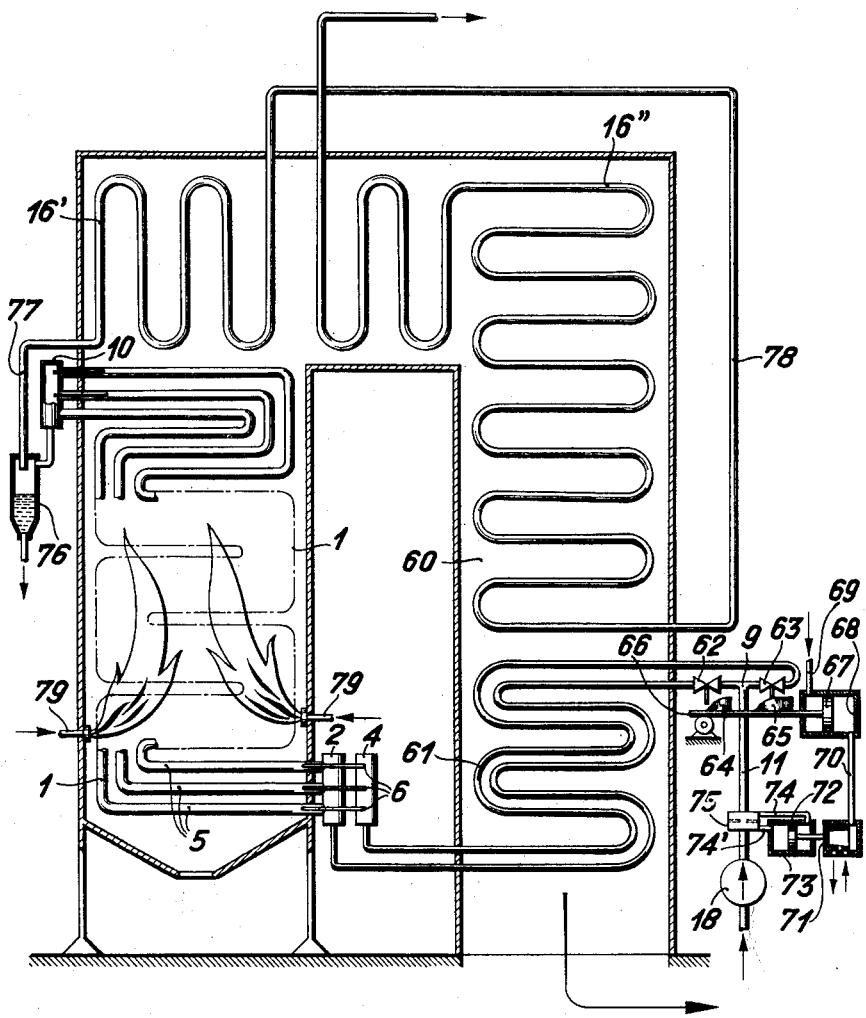

May 19, 1964  R. LITWINOFF  3,133,528
TUBULAR HEATING ELEMENT FOR HEATING FLUIDS
Filed May 28, 1962                                   5 Sheets-Sheet 5

Fig. 16 / Fig. 15 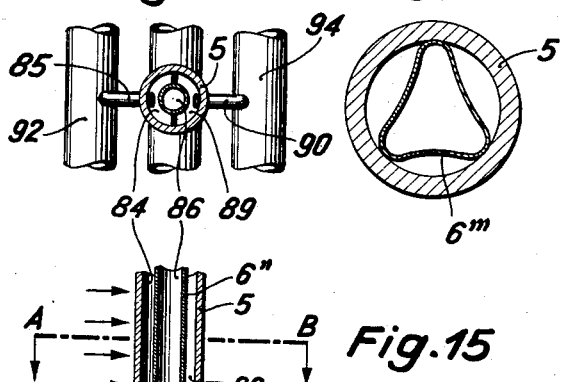
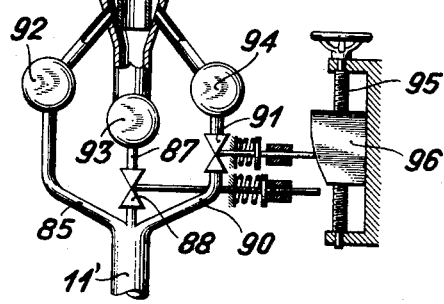

Inventor:
RICHARD LITWINOFF
By K. A. Mays
Attorney

United States Patent Office 3,133,528
Patented May 19, 1964

3,133,528
TUBULAR HEATING ELEMENT FOR
HEATING FLUIDS
Richard Litwinoff, Winterthur, Switzerland, assignor to
Sulzer Frères, S.A., Winterthur, Switzerland, a corporation of Switzerland
Filed May 28, 1962, Ser. No. 198,141
Claims priority, application Switzerland June 9, 1961
11 Claims. (Cl. 122—406)

The present invention relates to tubular heating elements suitable for forming a heating surface, for example, in a steam generator wherein at least two heating elements are arranged in parallel relation with respect to the flow of the fluid to be heated through the heating elements.

When arranging a plurality of heating tubes in parallel relation with respect to the flow of the fluid to be heated passing through the tubes and passing the fluid at variable flow rates through the tubes it is important to maintain stable flow conditions particularly if the flow rate is considerably reduced. It is well known that less fluid flows through those of a plurality of parallel tubes which receive more heat than the other tubes, because there is a greater flow resistance in the thermally higher loaded tubes than in the other tubes. If the parallel arranged tubes extend between a distributor and a collector and the pressure drop between the distributor and the collector is small, the flow through the tubes may become unstable, causing superheating and eventually bursting of the thermally higher loaded tube. Flow instability may also be caused by a reduction of the flow area in one of the parallel arranged tubes, for example, due to globules resulting from welding and extending into the interior of the tube.

Flow instability is usually avoided by maintaining a sufficiently great pressure drop in the respective zones, either by increasing the flow velocity or by providing a throttling element in each tube. This, however, has the disadvantage that the effect is much reduced when the heating surface operates at part-load, i.e., if the rate of flow through the tubes is much reduced, and that additional pumps and additional pump driving power are needed when the heating surface operates at full load.

It is an object of the present invention to provide a heating element of which a great number may be arranged in parallel relation with respect to the flow of a medium to be heated to form a heating surface, whereby each heating element is so designed that flow instabilities in the heating elements due to increased flow resistance in one or several of the heating elements are effectively prevented.

The heating element according to the invention comprises a tube whose interior is divided into at least two spaces extending in parallel relation and axially over at least a portion of the tube, and flow control means for varying the rate of flow of fluid to be heated through at least one of said spaces.

Upon reduction of the load on the heating element the rate of flow of fluid to be heated through at least one of the aforedescribed spaces is reduced or stopped so that fluid to be heated passes only through the other or others of said spaces. The flow velocity in the space or spaces which are still passed by fluid is so great that flow instabilities are avoided. At full load or relatively great load the rate of flow of fluid through the controlled space is increased and fluid flows through all spaces. Longitudinal subdivision of the interior of the tubes forming part of the heating elements is effected by relatively thin walls providing good heat transfer conditions so that there is little difference between the temperatures of the fluid in the individual spaces.

In a preferred embodiment of the invention the rate of flow is made variable in that one of the longitudinal spaces in the tubes of the heating elements which space is least exposed to heat. This is of particular advantage if heating elements according to the invention form part of the heating surface of a forced flow steam generator and water is converted into steam in the heating elements. The heating elements according to the invention are suitable to form heating surfaces of forced flow steam generators operating at subcritical as well as at supercritical pressure.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 4 is a diagrammatic vertical sectional view of a forced flow steam generator suitable for operation at subcritical pressure.

FIG. 15 is a part-sectional illustration of the lower end of a heating element according to the invention whose interior is divided into three spaces extending parallel to the longitudinal axis of the element, the figure also showing control means for controlling the operation of the heating element.

FIG. 16 is a sectional view of the heating element and contiguous parts shown in FIG. 15, the section being made along line A—B of FIG. 15.

Figure 1:
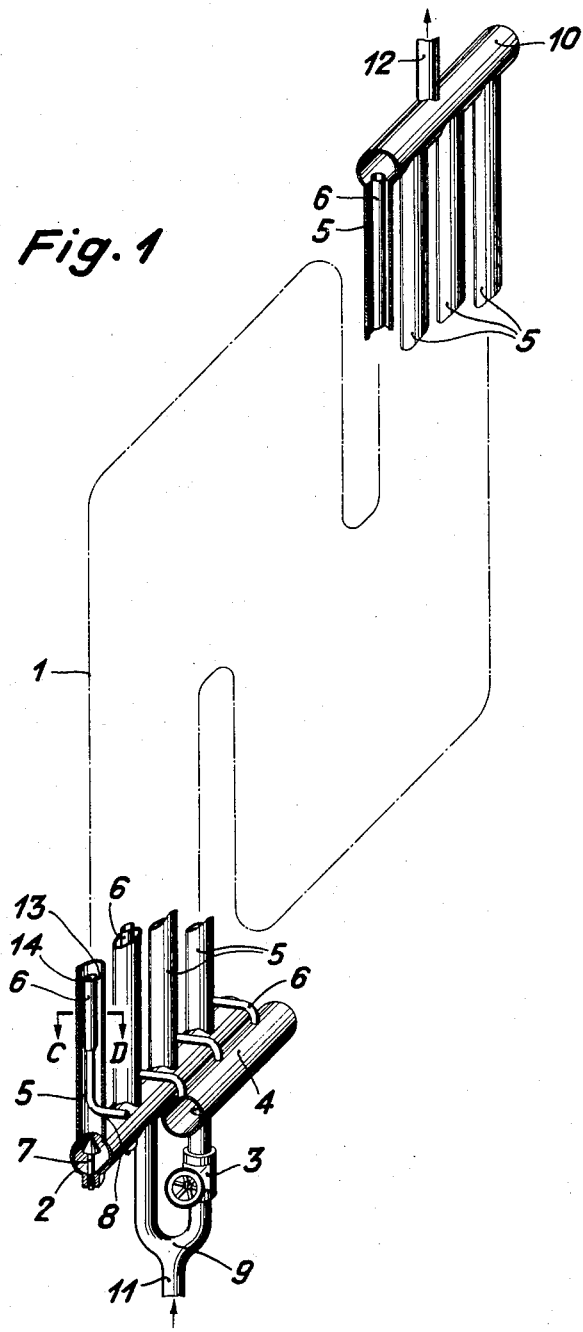
FIG. 1 is a perspective part-sectional illustration of portions of heating surface according to the invention suitable for converting water into steam.

Referring more particularly to FIG. 1 of the drawing, numeral 1 generally designates a heating surface of a forced flow steam generator in which heating surface water is converted into steam. The heating surface 1 comprises a plurality of tubes 5 whose inlets are connected to a header or distributor 2 and whose outlets are connected to a header or collector 10 for conducting the liquid to be evaporated in parallel relation through the tubes 5. The tubes are bent meanderlike. Throttling elements 7 are provided inside the distributor 2 adjacent to the inlet of each tube 5. A tube 6 is coaxially placed in each tube 5, the inlets of the tubes 6 extending at 8 through the walls of the respective tubes 5 and being connected to a distributor 4. The outlets of the tubes 6 terminate in the collector 10. The interior of each tube 5 is divided into two coaxial spaces one of which is annular (13) between the tubes 5 and 6 and the second space is formed by the interior of the tube 6. The annular space 13 is exposed to greater heating intensity than the interior 14 of the tube 6, the entire heating surface 1 being exposed to products of combustion produced by means not shown in FIG. 1. The portion of each tube 6 which penetrates the wall of the respective tube 5 has a reduced diameter for effecting a pressure drop between the distributor 4 and the wide, main portion of the tube 6. A feedwater supply pipe 11 branches at 9 into two conduits one of which is connected to the distributor 2 and the second is connected to the distributor 4. A valve 3 is interposed in the second conduit. A pipe 12 is connected to the collector 10 for conducting the steam produced in the heating surface 1 to a superheater, not shown.

When the heating surface operates at full load, the valve 3 is fully opened and feedwater flows from the pipe 11 into the distributors 2 and 4 and therefrom into the pipes 5 and 6, respectively. The water evaporates while passing through the heating surface 1. When the heating surface operates at partial load the flow area of the valve 3 is reduced so that relatively less feedwater flows through the tubes 6 while the rate of feedwater flow through the tubes 5 remains relatively great. In this way flow instabilities in the heating surface are avoided. At very low load the valve 3 may be completely closed so that all feedwater supplied through the pipe 11 flows through the tubes 5 and nothing flows through the tubes 6.

Since the pressures in the spaces 13 and 14 are substantially equal the wall of the tube 6 can be thin.

Figure 2:
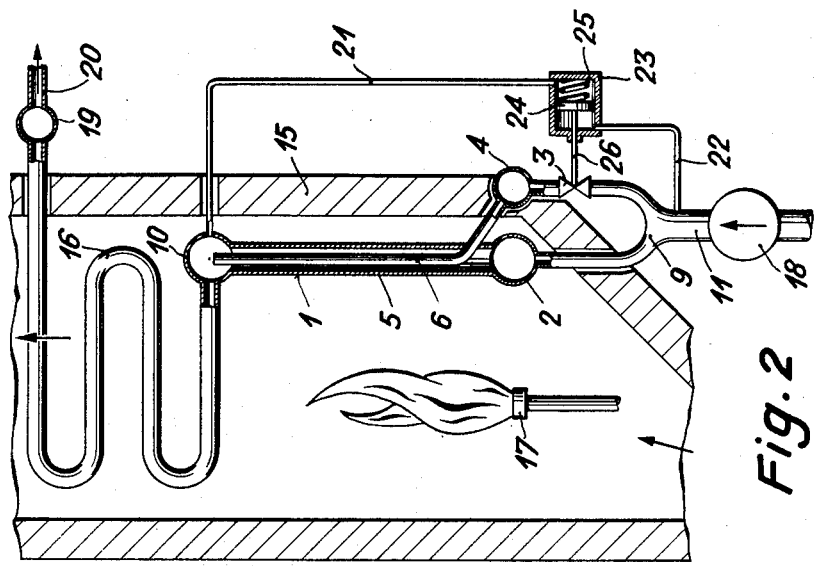
FIG. 2 is a diagrammatic vertical sectional view of a combustion chamber containing heating elements according to the invention, the figure also showing a control system for the heating elements.

In the application of the invention shown in FIG. 2 the heating surface 1 lines part of a wall 15 of a combustion chamber. A superheater 16 which is connected to the collector 10 for receiving steam therefrom is placed in the flue which follows the combustion chamber. The heating surface 1 shown in FIG. 2 is substantially of same structure as the heating surface 1 shown in FIG. 1, a plurality of tubes 5 being arranged in parallel with respect to the flow of the operating medium between the distributor 2 and the collector 10. Tubes 6 are placed within the tubes 5 and receive operating medium from a distributor 4 and discharge the heated operating medium into the collector 10. The heating surface 1 in FIG. 2 is exposed to radiant heat produced by a firing apparatus 17. A feed pump 18 is interposed in the feed pipe 11 and a collector 19 is connected to the superheater tubes 16 and supplies superheated steam into the steam main 20. A valve 3 is interposed in the conduit connecting the pipe 11 and the header 4. Whereas in the embodiment shown in FIG. 1 the valve 3 is manually operated, in the arrangement shown in FIG. 2 the valve 3 is automatically controlled in response to the pressure drop between the pipe 11 and the header 10. For this purpose a pipe 21 is connected to the header 10 and a pipe 22 is connected to the pipe 11 downstream of the feed pump 18. The pipes 21 and 22 are connected to chambers in a cylinder 23 on opposite sides of a piston 24. The latter has one side resting on a spring 25 and a piston rod 26 connected to the opposite side which piston rod is connected to the valve 3 for actuating the latter.

When the steam generator operates at full load the pressure drop in the section of the heating surface of the generator wherein water is converted into steam is great and the piston 24 is pushed to the right against the action of the spring 25 whereby the valve 3 is opened. At partial load the pressure drop between the feed pipe 11 and the collector 10 is relatively small so that the spring 25 can press the piston 24 to the left and move the valve 3 in a closing direction. This reduces the rate of flow through the tubes 6 while a sufficiently great rate of flow is maintained in the annular spaces between the tubes 5 and the tubes 6 to avoid flow instabilities in the heating elements wherein water is converted into steam.

Figure 3:
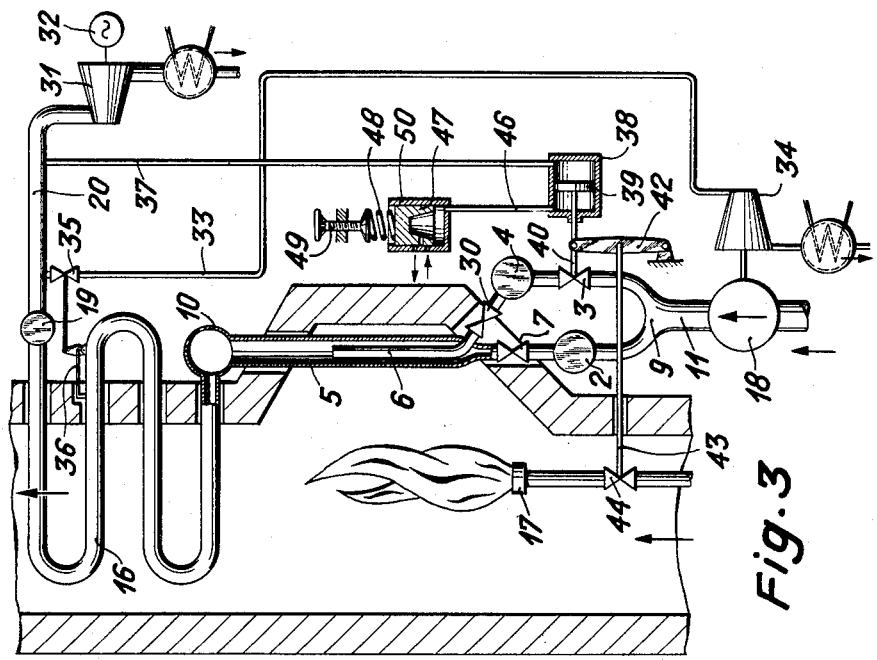
FIG. 3 is a diagrammatic vertical sectional view of a combustion chamber wherein modified heating elements according to the invention are placed, FIGURE 3 also showing a modified control system for the heating elements.

In the embodiment of the invention shown in FIG. 3 the pipes 5 are used for lining a portion of the wall of a combustion chamber. The tubes 6 do not extend through the entire length of the tubes 5 but only through a portion of the tubes 5 extending from the inlet of the tubes. Each tube 6 is provided with a valve 30 which has the same effect as the reduced diameter inlet portions of the tubes 6 in FIG. 1. The steam main 20 is connected to a turbine 31 driving an electric generator 32. A pipe 33 is connected to the steam main 20 for conducting live steam to a turbine 34 driving a feed pump 18. Flow of steam through the pipe 33 is controlled by a valve 35 in response to the temperature of the superheater 16 which is measured by a thermostat 36. Therefore, in the arrangement shown in FIG. 3, the feed pump is operated in response to the temperature of the superheated steam.

In the conduit connecting the pipe 11 to the header 4 for supplying feedwater to the tubes 6 a valve 3 is interposed which is controlled by a servomotor including a cylinder 38 and a piston 39 movable therein. The space at the right side of the piston 39 is connected by a pipe 37 to the steam main 20. The left side of the piston 39 is connected by means of a rod 40 to the valve 3. The free end of a lever 42 is connected to the rod 40, the lever being connected by means of a rod 43 to a valve 44 controlling the fuel supply to the combustion apparatus 17. The illustrated control system actuates the valve 3 as well as the fuel supply to the combustion apparatus 17 in response to the live steam pressure. The chamber in the cylinder 38 at the left side of the piston 39 is connected through a pipe 46 to the space in a cylinder 50 below a piston element 47. The top side of the latter rests against a spring 48 whose tension can be manually controlled by manipulating a spindle 49. A pressure fluid can be supplied to and withdrawn from the cylinder 50, depending on the position of the piston element 47 in the cylinder. The elements 47 to 50 form a set point setting device which affords adjustment of the set point by manipulation of the spindle 49 for controlling the pressure to which the servomotor for actuating the valves 3 and 44 responds.

Rising pressure in the steam main 20 and in the pipe 37 causes movement of the piston 39 to the left and rocking of the lever 42 in counterclockwise direction. This effects closing of the fuel valve 44 so that less steam will be produced and the pressure in the steam main 20 drops. Rising pressure in the steam main 20 indicates a drop of the load which, through the servomotor 38, 39 causes movement of the rod 40 to the left and closing of the valve 3 so that less water is supplied to the tubes 6.

The steam generator shown in FIG. 4 is designed for operation at subcritical pressures. The conduits connecting the feed pipe 11 to the distributors 2 and 4 form an economizer heating surface 61 which is placed at a relatively cool part of the flue 60. Valves 62 and 63 are interposed at the inlet of each of the conduits branching from the feed pipe 11. The valves 62 and 63 are actuated by cams 64 and 65, respectively, which are connected to a common rod 66 extending from a piston 67. The latter is reciprocal in a cylinder 68. The space in the cylinder 68 at the piston rod side of the piston 67 is connected through a pipe 39 to a set point adjusting device, for example, as shown in FIG. 3. The space in the cylinder 68 at the side opposite the piston rod side of the piston 67 is connected through a pipe 70 to a cylinder containing a piston valve 71 which controls supply and discharge of a pressure fluid into the cylinder.

The piston valve 71 is connected to a piston 72 movable in a cylinder 73 whose spaces on the sides of the piston 72 are connected through pipes 74 and 74′ to the sides of an orifice plate 75 arranged in the feed pipe 11 downstream of the feed pump 18.

The evaporating heating surface 1 of the steam generator shown in FIG. 4 is constructed substantially like the heating surface 1 shown in FIG. 1. Three tubes 5 are connected to the distributor 2. The tubes 5 are bent in meanderlike fashion and form the lining of a combustion chamber. Within each tube 5 a tube 6 of smaller diameter is placed. The tubes 5 as well as the tubes 6 terminate in a collector 10 which is connected for fluid flow to a water separator 76. The steam space of the latter is connected by a pipe 77 to a superheater 16′ which is exposed to radiant heat developed in the combustion chamber which is lined by the heating surface 1. The superheater 16' is connected through a pipe 78 to a second superheater 16" which is placed in the boiler flue to receive heat by convection. The combustion chamber is heated by fuel burners 79 which may be constructed as tilting burners.

When the steam generator operates at full load the feed pump 18 forces feedwater through the orifice plate 75 into the feed pipe 11. The latter is split at 9 into two branches containing valves 62 and 63 and feeding feedwater into two tubular economizer heating surfaces 61 through which the feedwater flows in parallel relation. One of the economizers discharges the heated feedwater into the distributor 2. The second economizer discharges the heated feedwater into the distributor 4. At full load operation both valves 62 and 63 are fully opened. When it is desired that the steam generator operate at a lower load a signal produced by a set point signal transmitter, not shown, is conducted through conduit 69 into cylinder 68 at the side of piston 67 to which piston rod 66 is connected. In order to reduce the output of the steam generator the pressure in the conduit 69 is reduced and the piston 67 moves to the left as seen in FIG. 4. The cam element 65 mounted on the piston rod 66 engages the valve 63 and tends to close it upon movement of the cam element to the left. A second cam element 64 mounted on the piston rod 66 engages the valve 62 upon continued movement of the piston 67 and of the piston rod 66 to the left so that also the flow area of the valve 62 is reduced. Closing of the valve 63 causes a reduction of the supply of feedwater to the tubes 6. When, after closing of the valve 63, the load on the steam generator is still further reduced the valve 62 begins to close and reduces feedwater supply to the tubes 5, and instability of the flow of operating medium through the evaporating section 1 of the steam generator is avoided.

The rate of flow of the feedwater through the feed pipe 11 is indicated by the flowmeter including the cylinder 73 with the piston 72 reciprocating therein. The piston 72 actuates the piston valve 71 which controls the flow of a pressure fluid into and from the space in the cylinder 68 at the right side of the piston 67.

Reduction of the rate of flow of feedwater causes a drop of the pressure in the conduit 70 and in the space at the right side of the piston 67 so that the latter moves to the right until the set point signal pressure in the conduit 69 and the pressure in the conduit 70 corresponding to the rate of feedwater supply are equalized.

Aside from the advantage of avoiding flow instabilities in the evaporating surface 1 the arrangement according to FIG. 4 has the additional advantage that at part load the heat absorption of at least one of the two economizer heating surfaces 61 is reduced so that the flue gas is less cooled and condensation on and corrosion of said heating surface are avoided.

Figure 5:
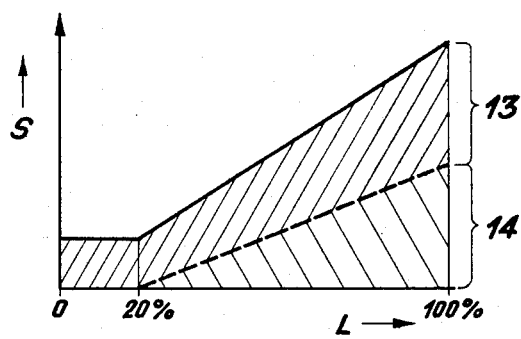
FIGS. 5 to 7 are diagrams illustrating operating conditions of heating elements according to the invention.

In the diagram FIG. 5 the abscissa represents the load L and the ordinates represent the rate of feedwater flow S. The shaded area 14 below the dotted line in FIG. 5 represents the feedwater flow through one of the economizers and the shaded area 13 above the dotted line represents the feedwater flow through the second economizer of the arrangement according to FIG. 4. The area 14 also represents the flow of feedwater through the tubes 6 which receive less heat than the tubes 5, the rate of working medium flow through which is represented by the area 13. At full load the rate of flow of feedwater through both economizers is about the same, whereas at 20% of full load the valve 3 in FIGS. 2 and 3 and the valve 63 in FIG. 4 are fully closed so that no feedwater flows into the tubes 6 and the entire feedwater flows into the tubes 5.

Figure 6:
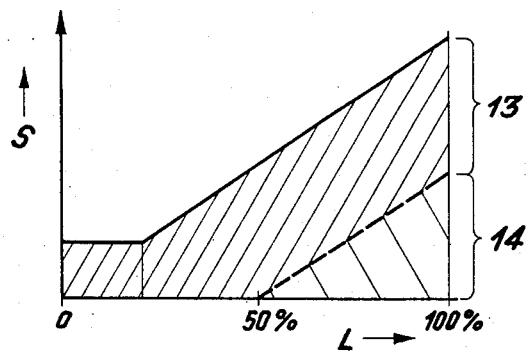

FIG. 6 illustrates an arrangement wherein the valves 3 or 63 are already fully closed at 50% load so that no feedwater flows through the tubes 6 between zero and 50% load. The valves 3 or 63 are so adjusted that between 50% and 100% load the amount of feedwater flowing through the tubes 5 remains unchanged.

Figure 7:
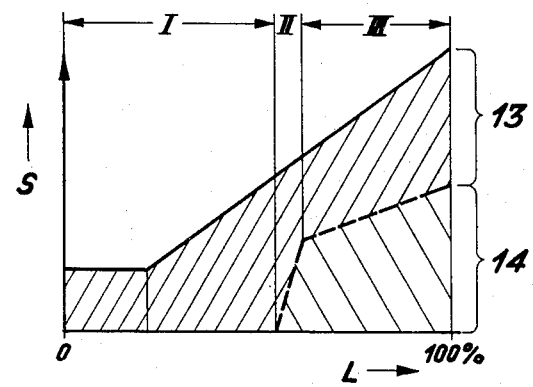

FIG. 7 illustrates an arrangement wherein the valve 3 or 63 is fully opened at the load range III. At the load range I the valves are fully closed. The load range II is the range during which the valves are closed or opened. The extent of the load range II depends on the construction of the valves. If this load range is very small the valves are of the type which is either fully opened or fully closed. The valves and the control thereof may be so arranged that the opening and closing is initiated at different loads.

Figure 8:
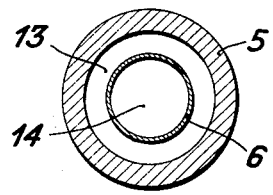
FIGS. 8 to 14 are cross-sectional views of seven modifications of heating elements according to the invention.

FIG. 8 illustrates a cross section through one of the heating elements of the evaporating surface 1, the section being made along line C—D of FIG. 1. The heating element includes an inner tube 6 which has a relatively thin wall and is substantially coaxial within the thick wall tube 5.

Figure 9:
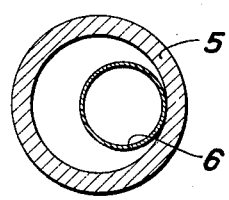
Figure 10:
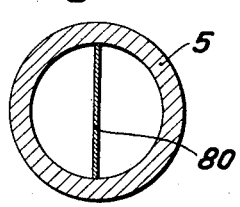

In the arrangement shown in FIG. 9 the thickness of the walls of the inner and outer tubes is the same as in FIG. 8, the inner tube, however, is placed eccentrically within the outer tube and is in contact with the outer tube. This arrangement may be of advantage in cases where the outer tubes 5 receive heat only at a portion of their circumference. In these cases it may also be of advantage to separate the spaces within the tube 5 by a plane plate 80 which extends parallel to the longitudinal axis of the tube 5 and divides the interior thereof into two substantially equal spaces as shown in FIG. 10. Here, the tube 5 is exposed only on one side to heat and at partial load less operating medium flows through the space on the side of the plate 80 which is less heated.

Figure 11:
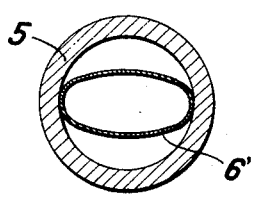

In the example illustrated in FIG. 11 the tube 5 contains a thin walled tube 6' having an elliptical cross section. The inner tube 6 may abut against the interior of the outer tube 5 or may be fused with or welded thereto. If there is abutment only the space within the tube 5 is divided into two spaces. If the tube 6' is welded to the tube 5 the space within the tube 5 is subdivided into three spaces.

Figure 12:
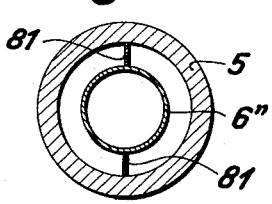

In the arrangement shown in FIG. 12 a tube 6" is coaxially placed within the outer tube 5 and is connected to the outer tube by ribs 81 which are parallel to the longitudinal axis of the heating element. With this arrangement the interior of the tube 5 is subdivided into three spaces.

Figure 13:
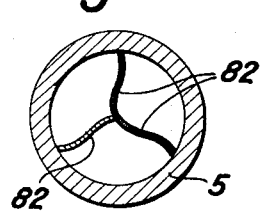

FIG. 13 illustrates another arrangement for subdividing the interior of the tube 5 into three spaces. Three plates 82 which are parallel to the longitudinal axis of the heating element are interconnected at the longitudinal axis of the tube 5 and individually extend to the interior wall of the tube 5. In the illustrated example the three plates 82 are undulated.

Figure 14:
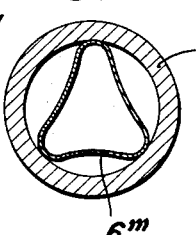

FIG. 14 shows an arrangement whereby the interior of the tube 5 may be subdivided into two, three or four spaces, depending on whether a tubular element 6'" having a cross-sectional configuration resembling a triangle is only pushed into the tube 5 or the latter is fused with or welded to two or three corners of the triangle. The corners of the triangle cross section of the tube 6'" are rounded and the sides of the triangle are slightly bent.

In the arrangement shown in FIGS. 15 and 16 a heating element according to FIG. 12 is used for forming a heating surface. The space 84 receives most heat as indicated by the four parallel arrows in FIG. 15. The space 84 is, therefore, directly connected to a feed pipe 11', i.e., there is no valve interposed in the pipe 85 branching from the feed pipe 11' and connected to the space 84. The space 86 which is formed by the tube 6" which is coaxial of the tube 5 receives relatively little heat. The tube 6" is connected by a pipe 87 with the feed pipe 11'. The pipe 87 is provided with a valve 88. The third space 89 in the tube 5, which space is exposed to least heat, is connected through a branch pipe 90 to the feed pipe 11', a valve 91 being interposed in the pipe 90. To each of the branch pipes 85, 87 and 90 a distributor 92, 93, 94, respectively, is connected for distributing the feedwater into a plurality of equally constructed heating elements 5, 6''. The valves 88 and 91 are actuated by a cam element 96 which can be moved up and down by rotating a threaded spindle 95. The element 96 is moved downward upon a reduction of the load on the steam generator so that at first the valve 91 is closed and the feedwater supply to the spaces 89 in the heating elements 5, 6 is reduced. Upon continued reduction of the load on the steam generator the element 96 is moved further down whereby also the valve 88 is moved in a closing direction and feedwater supply to the spaces 86 is reduced and may be stopped.

Figure 17:
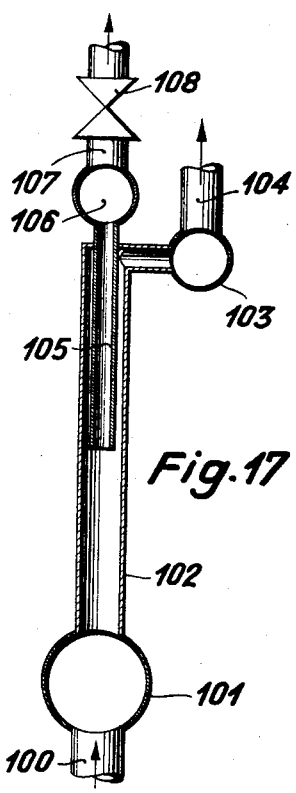
FIG. 17 is a diagrammatic longitudinal sectional view of a heating element according to the invention suitable for heating steam.

The invention is not limited to arrangements wherein the interiors of the heating elements are subdivided into at least two spaces through which operating medium flows in parallel direction and which are arranged at the inlet portion of the heating elements and may extend through part of the element or to the outlet of the element. Subdivision of the interior of the individual heating elements may be effected at the outlet portion of the elements, there being no subdivision at the inlet portion. This is shown in FIG. 17 and is of particular advantage if the heating element is used as a superheating surface. The steam flows through a pipe 100 into a distributor 101 whereto a plurality of tubular superheating elements 102 are connected, one element 102 being shown only. The elements 102 terminate in a collector 103 wherefrom the superheated steam is removed through a pipe 104. A tube 105 extends into each element 102, the tubes 105 being connected to a collector 106 which discharges into a pipe 107 provided with a valve 108. When the elements are operated at part load, the flow area of the valve 108 is reduced or the valve is closed so that the rate of steam flow through the tubes 105 is reduced or stopped. The pipes 104 and 107 may be connected or they may be individually connected to the valve chests of a steam turbine. In the latter case a valve would be arranged in the pipe 104 and this valve and the valve 108 could serve also as turbine inlet valves. The arrangement according to FIG. 17 is of advantage in superheaters because, here, the steam velocity at the outlet of the heating elements is greater than at the inlet and the pressure drop in the outlet portion of the element is greater than in the inlet portion. By placing the tubes 105 in the outlet portion of the tubes 102 a greater pressure drop is effected upon closing of the valve 108 at partial load than would be the case if the tubes 104 would be of the same length as the tubes 102 and extend from the inlet of the latter.

I claim:

1. In a steam generator operating at variable load wherein heat is transferred from a heating gas to water and steam flowing through tubes, a plurality of tubular heating elements, means causing a heating gas to flow over said heating elements for externally heating said elements, means for dividing the interior of at least a portion of the length of each of said elements into at least two spaces extending parallel to the longitudinal axis of said elements, an operating medium to be heated supplied into said spaces, the operating medium flowing in parallel relation through said spaces, control means operatively connected to at least one of said spaces of each heating element for altering the rate of flow of operating medium to be heated into said last mentioned spaces, and means responsive to the load on the steam generator and operatively connected to said rate of flow control means for increasing the rate of flow upon an increase of the load and for decreasing the rate of flow upon a decrease of the load.

2. In a steam generator operating at variable load wherein heat is transferred from a heating gas to water and steam flowing through tubes, a plurality of tubular heating elements, means causing a heating gas to flow over said heating elements for externally heating said elements, means for dividing the interior of at least a portion of the length of each of said elements into at least two spaces extending parallel to the longitudinal axis of said elements, an operating medium to be heated supplied into said spaces, the operating medium flowing in parallel relation through said spaces, control means operatively connected to at least one of said spaces of each heating element for altering the rate of flow of operating medium to be heated into said last mentioned spaces, and means responsive to the pressure drop in said heating elements and operatively connected to said rate of flow control means for increasing the rate of flow upon an increase of the pressure drop and conversely.

3. In a steam generator including an economizer wherein heat is transferred from a heating gas to feedwater: a plurality of tubular heating elements, means causing products of combustion to flow over said heating elements for externally heating said elements, means for dividing the interior of at least a portion of the length of each of said element into at least two spaces extending parallel with the longitudinal axis of the elements, a water distributor connected to one of the spaces of each of said elements for supplying water to be heated thereinto, a water distributor connected to the second of said spaces of each of said elements for supplying water thereinto, a feedwater supply pipe branching into two conduits, one of said conduits being connected to one of said distributors, the second conduit being conneced to the second distributor, and a rate of water flow control means interposed in one of said conduits, said conduits forming at least a part of the economizer of the steam generator.

4. In a forced flow tubular steam generator operating at variable load and having an evaporating zone wherein heat is transferred from products of combustion to water for evaporating the water: a plurality of tubular heating elements forming at least part of said evaporating zone, means causing products of combustion to flow over said heating elements for externally heating said elements, means for dividing the interior of a substantial portion of the length of each of said elements into at least two spaces extending parallel with the longitudinal axis of said elements, water to be evaporated supplied into said spaces, the water flowing in parallel relation through said spaces, and control means operatively connected to at least one of said spaces of each heating element for altering the rate of flow of water to be evaporated into said last mentioned spaces for reducing said rate of flow upon reduction of the load on said steam generator and conversely.

5. In a heat exchange apparatus for heating variable amounts of a fluid:
a plurality of externally heated tubular elements,
means for longitudinally dividing the interiors of at least a substantial portion of the length of each of said elements into at least two separate spaces,
a fluid to be heated flowing in parallel relation through said spaces,
supply means for supplying the fluid to be heated at variable rates to said elements,
said supply means including means for dividing the fluid to be heated into a least two streams,
conduit means for conducting the fluid of one stream into one of said spaces of each of said elements,
conduit means for conducting the fluid of the second stream into a second of said spaces of each of said elements, and
means operatively connected to at least one of said conduit means for altering the rate of fluid flow therethrough, for decreasing said rate of fluid flow upon a decrease of the rate at which the fluid to be heated is supplied by said supply means and conversely.

6. In a heat exchange apparatus as defined in claim 5, means causing a heating fluid to flow over said heating elements for externally heating said elements, said heating elements and said dividing means being so constructed and arranged that said spaces receive different amounts of heat from the heating fluid, said means for altering the rate of fluid flow being operatively connected to that one of said conduit means which conducts fluid into the spaces which receive the smaller amount of heat.

7. In a heat exchange apparatus as defined in claim 5 wherein each of said tubular heating elements comprises an outer tube of circular cross section, and said means for dividing the interior of at least a substantial portion of the length of the element is formed by a tube of elliptical cross section fitted into said outer tube.

8. In a heat exchange apparatus as defined in claim 5 wherein each of said heating elements comprises a tube, and said means for dividing the interior of at least a substantial portion of the length of the element is formed by separating walls extending from the inside of said tube in substantially parallel relation to the longitudinal axis of said tube.

9. In a heat exchange apparatus according to claim 8 and wherein said separating walls are undulated parallel to the longitudinal axis of said tube.

10. In a heat exchange apparatus for heating variable amounts of a fluid:
 a plurality of tubular heating elements,
 means causing a heating fluid to flow over said heating elements for externally heating said elements,
 means for dividing the interior of at least a substantial portion of the length of each of said elements into at least two spaces extending parallel with the longitudinal extension of said elements,
 a fluid distributor connected to one of the spaces of each of said elements for supplying fluid to be heated thereinto,
 a fluid distributor connected to the second of said spaces of each of said elements for supplying fluid to be heated thereinto,
 a fluid supply pipe branching into two conduits, one of said conduits being connected to one of said distributors, the second conduit being connected to the second distributor, and
 a rate of fluid flow control means interposed in one of said conduits for reducing the rate of fluid flow in one of said conduits upon a reduction of the amount of fluid to be heated and conversely.

11. In a heat exchange apparatus for heating variable amounts of a fluid:
 a plurality of tubular heating elements,
 means causing a heating fluid to flow over said heating elements for externally heating said elements,
 means for dividing the interior of at least a substantial portion of the length of each of said elements into at least two spaces extending in the direction of the longitudinal extension of said elements,
 a fluid to be heated supplied into each of said spaces, the fluid to be heated flowing in parallel relation through said spaces,
 means operatively connected to at least one of said spaces of each of said heating elements for altering the rate of fluid flow therethrough for decreasing said rate of fluid flow upon a decrease of the amount of fluid to be heated and conversely, and
 a header connected to said tubular heating elements for receiving heated fluid from all said spaces.

References Cited in the file of this patent
UNITED STATES PATENTS

| | | |
|---|---|---|
| 830,946 | Wheelock | Sept. 11, 1906 |
| 2,704,534 | Dalin et al. | Mar. 22, 1955 |
| 2,966,896 | Vogler | Jan. 3, 1961 |